Jan. 9, 1968 J. K. DUNN 3,362,716

MINIATURE PORTABLE PHONOGRAPH

Filed April 29, 1964 3 Sheets-Sheet 1

INVENTOR.
JOHN K. DUNN

BY Fryer & Tjensvold

ATTORNEYS

Jan. 9, 1968 J. K. DUNN 3,362,716

MINIATURE PORTABLE PHONOGRAPH

Filed April 29, 1964 3 Sheets-Sheet 2

INVENTOR.
JOHN K. DUNN

BY Fryer & Tjensvold
ATTORNEYS

Jan. 9, 1968 J. K. DUNN 3,362,716

MINIATURE PORTABLE PHONOGRAPH

Filed April 29, 1964 3 Sheets-Sheet 3

INVENTOR.
JOHN K. DUNN

BY
Frye + Tjensvold
ATTORNEYS

United States Patent Office 3,362,716

Patented Jan. 9, 1968

3,362,716

MINIATURE PORTABLE PHONOGRAPH

John K. Dunn, Livermore, Calif., assignor, by mesne assignments, of eighty-five percent to John K. Dunn, Berkeley, and fifteen percent to Morton J. Fried, Livermore, Calif.

Filed Apr. 29, 1964, Ser. No. 363,488
13 Claims. (Cl. 274—9)

The present invention relates to phonographs and radio-phonographs and more particularly to new and novel methods and apparatus for reproducing sound from records.

Phonographs (sound reproducing machines using records) presently known in the art all include the following basic elements: a flat, horizontal, rotatable surface called a turntable which is normally powered by a motor to rotate at a desired constant speed for the purpose of rotating a record disposed on the turntable; a transducer which includes a needle which rides in a record groove and which operates to transduce characteristic markings on the record into electrical signals; an arm which carries the transducer on its free end and which is pivotally mounted at its other end whereby the transducer is held stationary relative to the rotating record but is free to move radially inwardly toward the center of the record in order that the needle may properly ride in the spiral groove of the record; an amplified for increasing the magnitude of the electrical signal generated by the transducer; and a speaker for transducing the amplified electrical signal into sound waves. Each of the basic components mentioned above represents a complete art in itself and the patent files are replete with various devices and methods relating to each of the aforementioned basic components. While the present invention teaches certain improvements in several of the basic components which are part of a phonograph, it more importantly teaches an entirely new and novel approach to the fundamental problem of reproducing sound from characteristic markings on a record.

The prior art is confined to systems wherein everything is designed to remain stationary while a record rotates; the present invention teaches an advantageous sound reproducing system which rotates while a record remains stationary.

Since the development of solid state devices such as transistors, electronically controlled mechanisms have become increasingly smaller. At the present time the limiting factor in the size of most electronically controlled mechanisms, such as radios and television sets, is something other than the electronic components. In the past, the size of a radio was, for the most part, determined by the size of the capacitors and tubes which were employed to receive electrical signals and condition them to drive a speaker; today the size of a radio need not be much larger than the speaker itself. Where an electronically controlled mechanism is comprised of electronic components and mechanical components, it often occurs that the electronic components occupy very little space but the overall size of the device is nonetheless rather large due to the mechanical components. When this occurs, efforts are generally made to develop new or superior mechanical components which are also small in size so that the entire mechanism can enjoy the same reduction in size (miniaturization) as the electronic components. When all of the components of a device can be significantly reduced in size, the device is often made portable, where such results are desirable.

A popular device which has not been successfully miniaturized to the same extent as similar electronic devices, such as the radio, is the phonograph. The reason for the failure of phonographs to be fully miniaturized can be found from an examination of the standard approach to reproducing sound from records and the necessary geometry which flows therefrom. As pointed out above, those phonographs presently known in the art include means for rotating a record and a means for holding a transducer stationary relative to the record. One dimension of such a device must be at least as great as the radius of the record being played. This follows since a portion of the device must support the record at its center while some other portion of the device must support the transducer holding arm at some location which is at a greater radial distance from the center of the record than the edge of the record itself. While the radius of a record represents the minimum dimension which known approaches to record playing allow, it does not represent the practical size which has in fact been commercially realized.

While the radius of a 45 r.p.m. record is not very great and a phonograph having no greater dimension would indeed be considered miniature, and thus truly portable, the operation of such a device, using known techniques would be of a necessarily low quality, bordering on inoperability.

The reason for this result can be found in an examination of the forces which a needle experiences as it is guided through a record groove. The characteristic workings of a record which give rise to sound generally take the form of "wiggles," or radial variations in the path of the groove (most records made by modern techniques have radial variations rather than vertical variations). These irregularities in the groove act against the needle and set up drag forces. When the needle encounters a portion of record groove having a high density of irregularities, the magnitude of the drag force created can actually slow down the record and thus distort the output. The most effective way of combating this problem is by adding to the inertia of the rotating record so that the drag forces will not materially affect the speed of rotation of the record. Thus, turntables weighing thirty pounds or more are not uncommon in the art.

As the turntable of a phonograph record player becomes smaller and lighter it adds less inertia to the record and thus acts less to assist the record to rotate at a constant speed. Thus, a miniature phonograph record player employing known techniques would of necessity have a turntable so small as to provide no significant additional inertia to the record itself. Very light records would slow down each time high needle drag occurred resulting in a sound reproduction of very poor quality, at best.

By abandoning the conventional approach to reproducing sound from records, wherein the record turns and the rest of the equipment stays stationary, the present invention provides a device for playing records which does not have a minimum size of something greater than the radius of a record nor does miniaturization prevent the device from effectively counteracting needle drag. The limiting factor in the size of a phonograph record player as taught by the present invention is for the most part the speaker employed to produce sound waves. Accordingly, it is possible to provide a phonograph employing the teachings of the present invention and practicing the methods taught by the present invention which is no larger than a pocket size transistorized radio as known today.

Accordingly, it is an object of the present invention to provide methods and apparatus for reproducing sound from a record wherein the record remains stationary at all times.

Another object of the present invention is to provide a device for reproducing sound from a record wherein a speaker, amplifier, arm, and cartridge are mounted for rotation relative to a stationary record.

Another object of the present invention is to provide a method for reproducing sound from a record wherein the steps include disposing a record on a flat, generally horizontal surface, maintaining the record stationary and rotating an amplifier, speaker, arm and transducer cartridge, all disposed about the center of the record.

A further object of the present invention is to provide a miniaturized phonograph record player including a radio receiver which is for the most part no larger in size than the radio receiver itself.

Further objects of the present invention are to provide a novel arm assembly for a rotating phonograph, a novel repeat system for a rotating phonograph, and a novel method for counteracting drag forces which exist between a phonograph needle and a record.

Still another object of the present invention is to teach methods and apparatus whereby a small transistor radio can be converted into a device for reproducing sound from a record.

Further and more specific objects and advantages of the invention are made apparent in the following specification wherein a preferred form of the invention is described by reference to the accompanying drawings.

In the drawings:

FIG. 1 is a plan view of the present invention shown in conjunction with a record with which it is operatively disposed wherein certain portions are broken away to more clearly reveal structural features of the invention;

FIG. 1*a* is a side elevation of a portion of the arm assembly of the present invention;

FIG. 2 is a side elevation of the present invention shown with respect to a record wherein certain portions are broken away, certain portions are shown in section and certain portions are not shown;

FIG. 2*a* is an enlarged view of an alternate locating means;

Figures 1, 1A, 2, 2A:
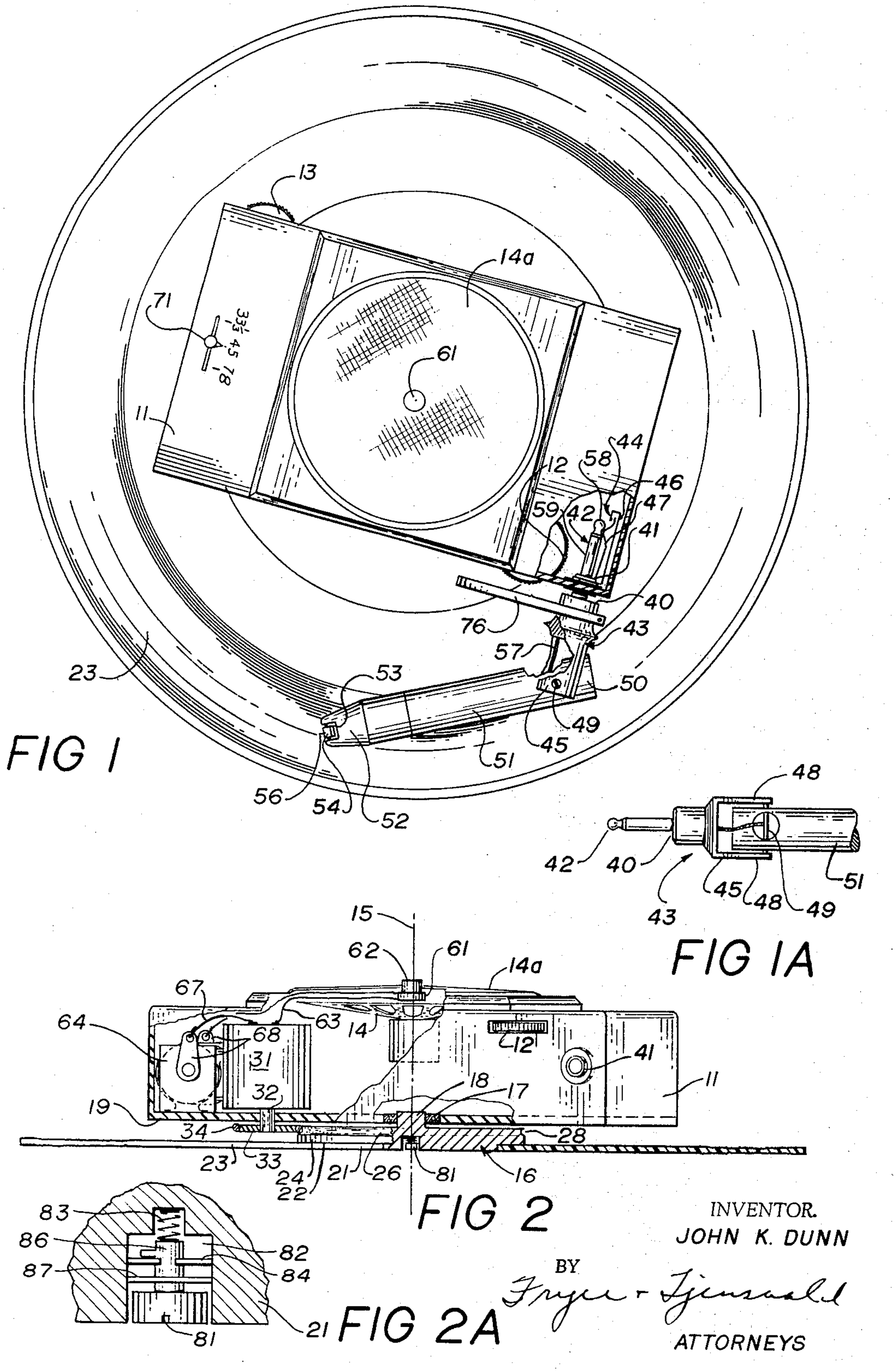

Referring now to FIGS. 1, 1*a* and 2, a housing 11 encloses the standard components of a transistorized radio; a tuner circuit controlled by a station selection knob 12; an amplifier circuit controlled by a volume control knob 13 (which knob also acts to control an on-off switch); and a speaker 14. The housing 11 with all of the components disposed therein is rotatably mounted on a generally circular pedestal 16. A bearing 17 is disposed between the pedestal shaft 18 and the lower member 19 of the housing 11 to form a rotatable connection between the housing and pedestal.

The pedestal 16 includes a lower circular portion 21 having a diameter approximately equal to the diameter of the central hole 22 in a record 23. This provides means for centrally locating the pedestal 16 with respect to the record 23.

A mid-portion 24 of pedestal 16 has a larger diameter than the lower or locating portion 21 so as to form an annular surface 26 which engages the upper surface of record 23 when the locating portion 21 is inserted into hole 22. The diameter of central portion 24 of pedestal 16 is sufficiently greater than the diameter of locating portion 21 to insure that the pedestal provides a stable support for the housing.

The pedestal 16 also includes an upper circular portion 26 having a generally vertical circumferential surface 28 which is designed to frictionally engage a drive member, and thus may advantageously be somewhat concave.

An alternate locating member 81 (FIG. 2*a*) is releasably secured in a compartment 82 formed at the center of the bottom surface of portion 21. A spring 83 urges member 81 downwardly while an upper stop 84 prevents the member from protruding below the lower surface of portion 21. When member 81 is rotated to align stop 84 with slot 86, the member moves downwardly until lower stop 87 is encountered. When released, the member 81 extends below portion 21 and the center of records having small central holes (33⅓ and 78 r.p.m. records generally) can be located. The lower surface of portion 21 then becomes the support surface. When 45 r.p.m. records are played, the member 81 is locked out of the way within compartment 82.

Together with the components normally found in a radio, housing 11 contains a motor 31 having a drive shaft 32 which extends through the lower member 19. Fixedly secured at the end of shaft 32 is a drive wheel 33 the circumference 34 of which is preferably formed from a material having a high coefficient of friction, such as rubber. The wheel 33 is located such that its circumference 34 bears against surface 28 forming a driving connection therewith. The ratio of internal motor gears (not shown), the size of wheel 33, the circumference of upper portion 27 of pedestal 16, and the voltage applied to motor 31 are all factors determining the speed at which the housing 11 rotates.

A connection jack 41 is disposed on one side of housing 11 and is designed to receive a cylindrical plug 42 which extends from end 40 of a tone arm support member 43. Associated with jack 41 is a switch 44 having a tuner circuit associated member 46 and an amplifier associated member 47. Switch 44 is employed for the purpose of disconnecting the tuner circuit from the amplifier circuit when the plug 42 is inserted into the jack 41. When plug 42 is not disposed in jack 41, switch 44 is closed and member 46 contacts member 47 forming a connection between the tuner circuit and the amplifier circuit whereby the radio signals received by the tuner circuit are amplified and directed to the speaker. When plug 42 is inserted into jack 41, however, the end of the plug contacts the amplifier associated member 47 and urges it out of contact with the tuner associated member 46 whereby the electrical connection between the tuner and amplifier is broken preventing radio signals from reaching the amplifier circuit.

Tone arm support member 43 has its other end 45 formed by a pair of spaced apart members 48 each of which supports one end of a vertically disposed pivot pin 49. Pivot pin 49 passes through end 50 of tone arm 51, which is disposed between members 48. The tone arm 51 is thereby hingedly supported and movable about a generally vertical axis which enables its free end 52 to be moved toward or away from the housing 11. The free end 52 of arm 51 terminates to form an open ended vertically disposed slot 53. Disposed in slot 53 is a pick-up cartridge 54 including a needle 56 which is operative to sense characteristic markings on a record.

The cartridge 54 is electrically connected to an electrical conductor 57 which passes through the center of arm 51 and through the center of support member 43 to the plug 42. Plug 42, of conventional design, has a tip portion 58 electrically separate from the plug body 59 but in electrical communication with the end of the plug to which conductor 51 is attached. Thus, when the plug 42 is inserted into the jack 41, the tip 58 not only causes the switch 44 to open, but also forms an electrical connection between the cartridge 54 and the amplifier circuit.

Figure 3:
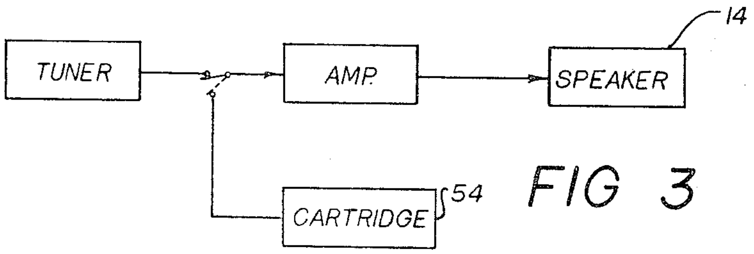
FIG. 3 is a block diagram illustrating the electrical relationship of the several electronic components of the present invention.

FIG. 3 illustrates in block diagram form the electrical consequences of inserting the plug 42 into the jack 41. The radio tuner circuit and the cartridge 54 provide alternate sources of electrical signals to the radio amplifier circuit which drives the speaker 14. When the cartridge 54 is inserted into the housing 11 by inserting plug 42 into jack 41 the tuner is automatically disconnected from the amplifier while the cartridge 54 is connected to the amplifier. In this way radio signals are prevented from reaching the amplifier while the signals generated by the cartridge 54 are amplified and transduced into sound waves by the speaker 14. When the cartridge 54 is disconnected from the housing 14 by withdrawing the plug 42 from the jack 41, the tuner circuit is placed back into communication with the amplifier circuit and the radio can be operated in its normal manner.

The necessity for switch 44 does not exist, of course, where the invention is not embodied in a device which is both a radio and a phonograph. When it is only desired to provide a device for playing records, the jack and plug simply serve to form electrical connection between the cartridge and amplifier without having to disconnect a tuner.

The cylindrical shape of plug 42 allows support member 43 to rotate about its generally horizontal, longitudinal axis so as to give tone arm 51 a degree of freedom which enables the cartridge 54 to be moved in a vertical direction. Thus, when the needle 56 is initially placed into a starting groove of a record, or when the record has been completely played and the needle is removed, the arm 51 can be lifted up without requiring that the entire housing 11 be displaced.

Located on the axis of rotation 15 of housing 11 (see FIG. 2) between speaker grill 14*a* and speaker 14 is a pushbutton switch 61 which includes an actuator button 62, which extends upwardly through the grill. The switch 61 includes a pair of electrical contacts (not shown) which can be electrically connected or electrically disconnected as a result of operation of the actuator 62. Such switches are well known in the art and are available in a wide variety of designs. For the present invention it is advantageous for the actuator 62 to be rotatable with respect to the remainder of the switch 61. The reason for this will be made obvious when operation of the switch is described. One of the two switch contacts is electrically connected to a conductor 63 which leads to motor 31, while the other contact of the switch is connected by a conductor 66 to one end of a battery 64. A conductor 67 connected between motor 31 and battery 64 completes a circuit which includes switch 61, battery 64 and motor 31. Each end of battery 64 is supported by a member 68 to which conductors 66 and 67 are connected and through which electrical connection is formed with battery 64.

The battery 64 is the source of energizing voltage for motor 31 and is effective to induce operation thereof when the switch 61 is closed. Since it is necessary to drive motor 31 at a constant speed, it may be necessary to add a Zener diode to the motor circuit in order to give a well controlled voltage supply. The use of Zener diodes for this purpose is well known in the art and well within the skill of competent technicians. The use of a Zener diode is not necessary, however, if a mercury battery or similar voltage source of constant output is employed.

Figures 4, 5, 6, 7:
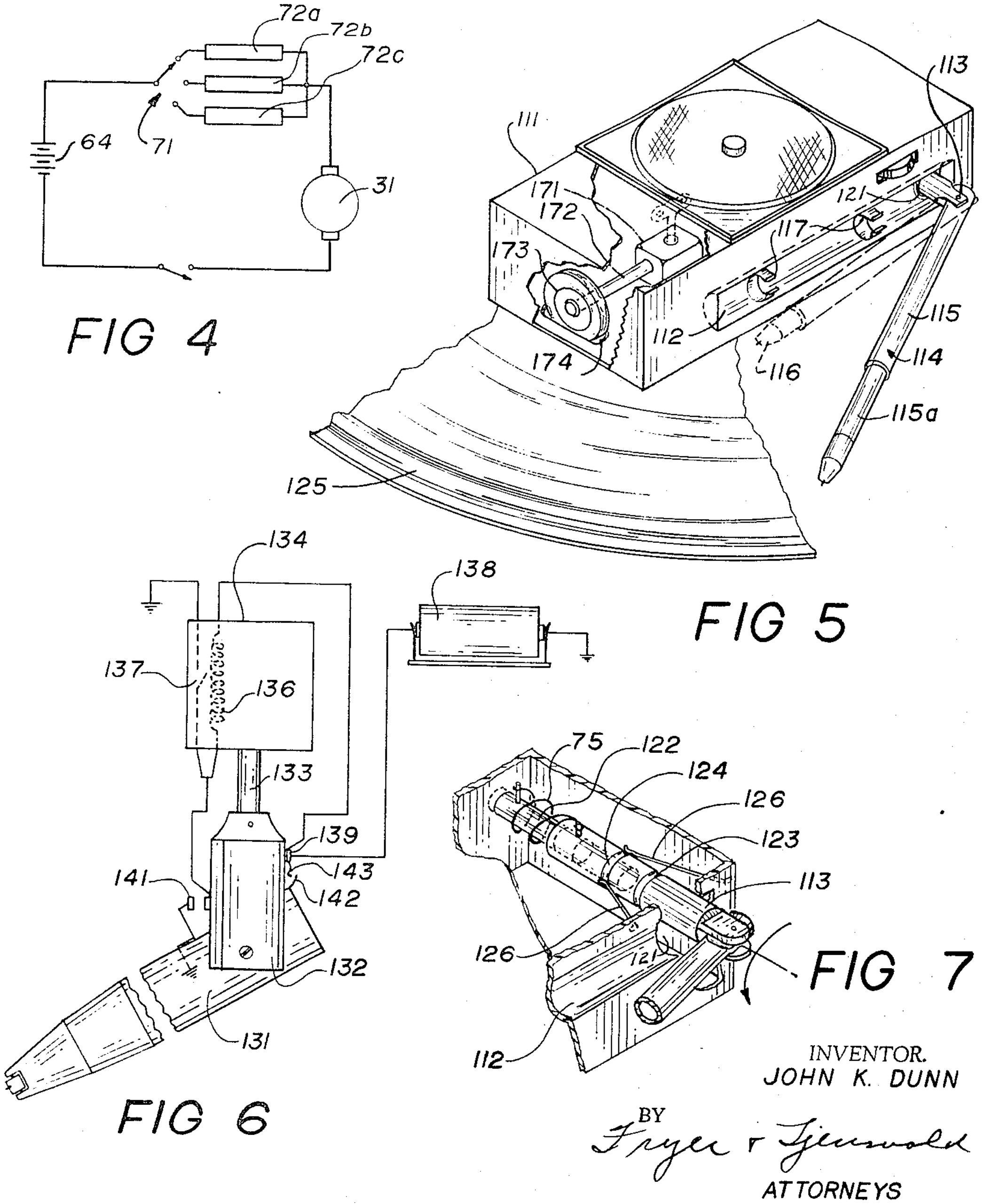
FIG. 4 is an electrical schematic diagram illustrating a speed control circuit.
FIG. 5 is an isometric illustration of an alternate embodiment of the present invention wherein certain portions are broken away.
FIG. 6 is a semi-schematic illustration of an automatic repeat system of the invention.
FIG. 7 is an enlarged view of a portion of the arm assembly of the device shown in FIG. 5.

An advantageous addition to the motor battery circuit is illustrated in FIG. 4. A switch 71 is electrically associated with battery 64, motor 31, and resistors 72*a*, 72*b*, and 72*c* in a way which makes it possible to insert one of the resistors in series with the battery and motor. Switch 71 is a single pole three position switch and has a resistor connected at each one of the three switch positions. The resistors, in turn, are electrically connected to the motor 31. Since the speed of motor 31 is a function of the voltage which is placed across it, and further since the voltage which drops across motor 31 is dependent on the size of the resistor in series therewith, the speed of motor 31 can be controlled by selecting one of the resistors 72*a*, 72*b* or 72*c* to be in series with the motor and battery. If the resistors are selected to place a voltage across motor 31, which will give rise to motor speeds which turn the housing 31 at 33⅓, 45 and 78 r.p.m., all popular speed records can be played by the present invention.

When it is desired to reproduce sound from record 23 (see FIGS. 1 and 2) with the present invention, the plug 42 is inserted into jack 41 and the locating portion 21 of pedestal 16 is inserted into the central opening 22 of record disc 23. The needle 56 at the end of arm 51 is located in a starting groove at the outer edge of record 23 and the volume is adjusted by means of control knob 13. With the pedestal and needle so disposed, the actuator 62 of switch 61 is operated placing voltage across the motor 31 resulting in energization of the motor and rotation of wheel 33. The frictional engagement of wheel 33 at its outer periphery 34 with the surface 28 of pedestal 16 causes the wheel to ride around the surface 28 at a constant speed, and in so doing urge the entire housing 11 to rotate at a constant speed. As housing 11 rotates (in a counter-clockwise direction as shown in FIG. 1) the arm 51 circles the record with the needle 56 riding the record groove. As the housing rotates the needle moves radially inwardly following the spiral path of the record groove, while the characteristic markings on the record are transduced by the cartridge 54, delivered to the amplifier circuit in housing 11 and transduced into sound waves by the speaker 14. When the record has been completely played, the actuator 62 is operated to remove the voltage from across motor 31 and thereby stop the rotation of housing 11.

The location of the actuator 62 on the axis of rotation of the housing 11 is most advantageous since that particular spot on the housing 11 does not move while the housing rotates, thus making it easy to locate the actuator at all times.

It is desirable that actuator 62 be rotatable with respect to the rest of switch 61 in order to operate normally when a downward force is applied thereto (which force also stops its rotation) for the purpose of disconnecting the battery from the motor.

When the housing 11 rotates and the arm 51 circles the record 23, there is a centrifugal force which acts on the arm 51 urging it in a direction generally away from the center of the record 23. If the arm 51 is heavy enough, and the speed of rotation great enough, the force acting on arm 51 will prevent the needle 56 from following the groove toward the record's center. It thus becomes desirable to keep the weight of the arm 51 to a minimum so as to keep the magnitude of the centrifugal force acting on the arm 51 below that value which interferes with the operation of the phonograph. By using light weight materials, such as plastic or aluminum, the entire arm 51 can be made sufficiently light to preclude any difficulties due to centrifugal force. In so doing, however, the downward force acting to maintain the needle 56 in the groove of the record 23 is no longer great enough to provide satisfactory operation. In order to satisfy both of these competing demands, i.e., sufficiently light arm to eliminate problems resulting from centrifugal force, and sufficient downward force acting on needle 56 to insure proper engagement with a record, a weight 76 is secured to support member 43. Weight 76 provides a force tending to rotate member 76 about its longitudinal axis in a counter-clockwise direction, and in so doing transmits a force through the tone arm 51 which acts downwardly on needle 56 so as to provide the needle with the necessary record engaging pressure. By virtue of weight 76 being located on support arm 43, the centrifugal force acting on the weight has no adverse effect on the operation of arm 51.

While the weight 76 is an advantageous means for applying pressure to needle 56 due to its uncomplicated nature, certain embodiments of the invention are better served by a spring 75 (see FIG. 7) disposed to provide the same result.

In order for a spring, weight or other means to be able to apply a downward pressure to needle 56 while acting on support member 43, it is necessary that the connection between member 43 and arm 51 be one which precludes rotation of arm 51 in a vertical plane relative to member 43. Thus, the arm assembly comprised of support member 43 and arm 51 must be capable, as a unit, of rotation in a vertical plane, but not allow such rotation between the arm assembly components.

One of the outstanding features of the present invention is the manner in which the entire sound reproducing means acts to counteract needle drag. The present invention in providing a truly miniaturized and portable phonograph is of necessity incapable of including a turntable weighing twenty or thirty pounds. The present invention, however, does provide a device which employs virtually all of the mass available to it to add inertia to the rotating mechanism, and in so doing assures that operation will be satisfactory.

FIG. 5 illustrates an alternate embodiment of the present invention wherein a spring energized wind-up motor 171 serves as the source of power for rotating the housing 111. Spring energized wind-up motors are well known in the art, as are escapement mechanisms for maintaining the output of the wind-up motor constant. Accordingly, the details of motor 171 are not shown. The motor 171 operates to drive a generally horizontally disposed drive shaft 172 which has a drive wheel 173 secured at its end. A portion of the drive wheel 173 extends out of the bottom of housing 111 through a slot 174 and engages the surface of a record 125 with which it forms a driving connection. The wheel 173 could also be designed to engage the pedestal on which the housing is mounted. When the energy in motor 171 is released, wheel 173 is driven around the record 125 and housing 111 rotates. By enlarging the width of slot 174 and making the radial position of wheel 173 variable (either by making the whole motor assembly radially adjustable or making the length of shaft 172 adjustable), the speed of rotation of the housing can be easily varied without changing the motor's operating speed.

One side of housing 111 includes a recessed portion 112 which forms an open compartment for storing an arm 114 when the arm is not in use. Arm 114 includes an outer member 115 which is hingedly secured to an arm support member 113. An inner arm member **115*a* is telescopically associated with outer member 116 whereby the overall length of arm 114 is variable. When inner member 115*a* is urged into outer member 115 to achieve the shortest overall length for arm 114, the end 116 of the arm does not extend beyond the end of recessed portion 112, thus making it possible for the arm to be housed in the recess and releasably held therein as by clips 117**.

FIG. 7 illustrates the detailed structure of support member 113 which enables the arm 114 to be moved in and out of recess 112. The support member 113 extends into the interior of housing 111 through a hole 121 which is located within the recess 112. The support member 113 has a longitudinal bore which receives a shaft 122 securely affixed within the housing 111. The shaft 122 forms a support for member 113 which enables the member to rotate about its longitudinal axis and also enables the longitudinal location of the member to be changed. A spring 75, having one end secured to the shaft 122 and one end secured to the member 113, provides the turning force which results in a desired pressure being applied to the needle carried by arm 114.

Circumscribed about the outer surface of member 113 at spaced apart locations are a pair of grooves 123 and 124. A pair of detent springs 126 bear against the surface of support member 113 and serve to hold the member in one of two longitudinal locations. When detent springs 126 engage recess 124 the member 113 is held in a longitudinal position which enables the arm 114 to operate normally for the purposes of reproducing sound from record 125. When it is desired to house the arm within the recess 112, the member 113 is longitudinally positioned such that the detents 126 engage the recess 123.

The telescoping nature of arm 114 together with the ability of member 113 to be longitudinally positioned with respect to housing 111 gives the embodiment shown in FIG. 5 a most convenient arm assembly which need not be removed each time the phonograph is converted to a radio.

Another important advantage of the telescoping arm 114 is its ability to adjust to records of various sizes and speeds. In order to play a long playing 33⅓ r.p.m. record, the inner member **115*a* is withdrawn from outer member 115 to enable the needle to reach the outer edge of the record. To adjust to smaller records, the arm 114 is shortened by urging member 115*a* into mmeber 115 until the needle can be conveniently placed at the edge of the record. In order to adjust to all records it may be necessary to vary the longitudinal position of support member 113 as well. This can be accomplished as by additional grooves in the surface of the member 113**.

The embodiment of FIG. 5 includes a horizontally rather than vertically disposed drive shaft, a permanently attached phonograph arm which can be conveniently housed in a recessed compartment in the side of the housing, a spring energized wind-up motor, and an arm of variable length. While those variations on the components shown in FIGS. 1 and 2 are all illustrated in a single device, it will be appreciated by those in the art that all of these alternate embodiments need not be found together to enjoy the advantages which they individually provide.

FIG. 6 illustrates a repeat system for the present invention whereby a record can be played more than once without requiring that the needle be manually reset. A tone arm 131 is secured to a support member 132 in essentially the same manner as that illustrated and described with reference to FIGS. 1 and 1*a*. The support member 132 is connected at one end to a shaft 133 of a rotary solenoid 134. Solenoid 134 includes a coil 136 which when energized operates to rotate the shaft 133 through a prescribed angle. The solenoid 134 further includes a set of contacts 137 which are normally open and which automatically close upon energization of the coil 136. A source of electrical energy 138 is connected at one of its ends to ground and at its other end to a normally closed switch 139. Normally closed switch 139 is in turn electrically connected to one end of coil 136 which in turn is electrically connected to a normally open switch 141 which leads to ground. Connected in electrical parallel with switch 141 is a normally open, solenoid operated latching switch 137.

In operation, the arm 131 moves gradually clockwise (as illustrated in FIG. 6) as a record is played until it reaches the end of the record at which time the angular position of arm 131 relative to member 132 results in switch 141 closing. When switch 141 closes, a complete electrical circuit from electrical source 138 through switch 139, through coil 136, and through switch 141 to ground is formed. The current which flows through this completed circuit energizes coil 136 which causes shaft 133 to rotate in a clockwise direction. When member 132 rotates the end of arm 131 is lifted from the record being played. The energization of coil 136 also results in switch 137 closing. When the end of arm 131 is raised from the record being played the centrifugal force acting against the rotating arm causes it to move in a counter-clockwise direction (as shown in FIG. 6) toward the edge of the record. Immediately upon the arm 131 moving in a counter-clockwise direction the contacts of switch 141 separate. This does not de-energize coil 136, however, since the closed latching switch 137 provides an alternate path to ground whereby the coil 136 remains energized.

When the arm 131 achieves the angular position relative to member 132 which corresponds to the free end of arm 131 being at the edge of the record, an actuator 142 secured to arm 131 engages a lever 143 which operates to open switch 139. When switch 139 is open, the source of electrical energy 138 is disconnected from the coil 136 causing the solenoid to be de-energized. When the coil is de-energized, the switch 137 opens and the shaft 133 rotates to allow the end of arm 131 to contact the record to be played. As the arm moves in a clockwise direction once again the contacts of switch 139 close, placing the circuit in its initial condition.

Figure 8:
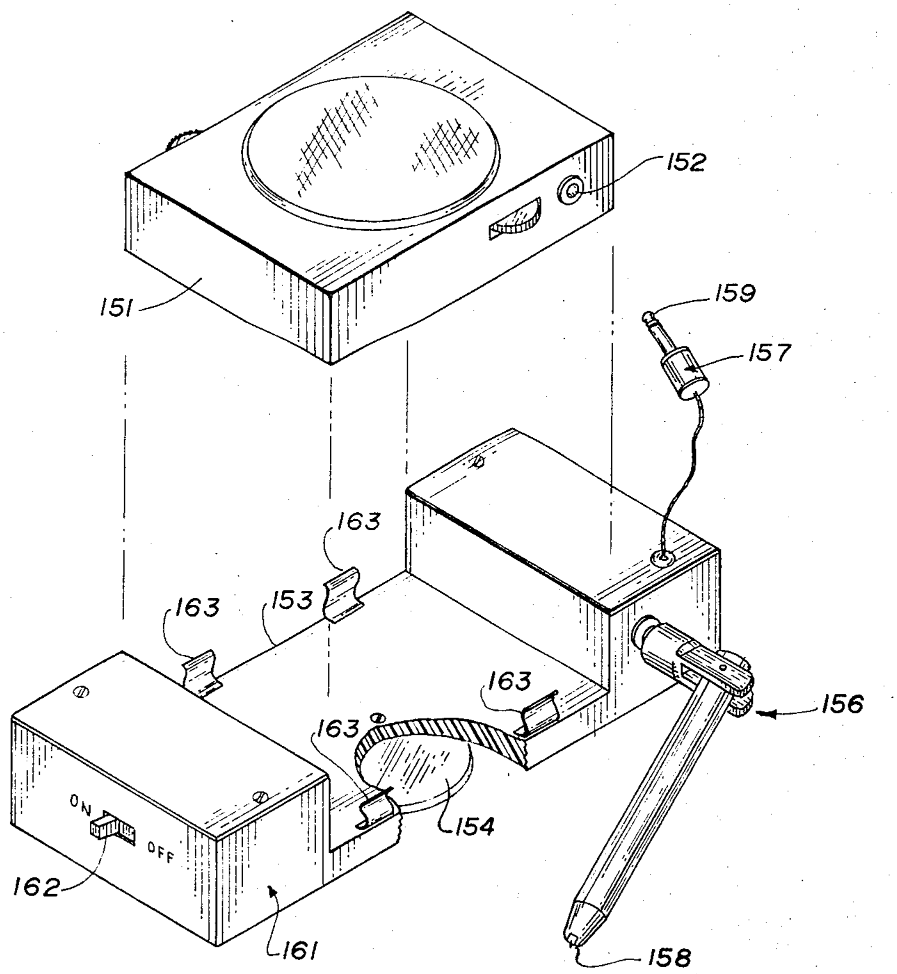
FIG. 8 is an isometric illustration of a radio-to-phonograph conversion system.

FIG. 8 illustrates an embodiment of the present invention wherein a housing 151 encloses a conventional transistor radio which is totally unmodified except for the presence of a jack 152 with an associated tuner separation switch (not shown) which functions in the same manner as the switch 44 illustrated and described with respect to FIG. 1. A platform 153 is rotatably mounted on a pedestal 154 and supports a phonograph arm assembly 156 at one of its ends. The phonograph arm assembly is electrically connected to a plug 157 whereby electrical signals generated by the transducer 158 carried by the arm assembly are made available at the end 159 of plug 157. The other end of platform 153 includes an enclosed compartment 161 which houses a motor for turning pedestal 154, a battery for energizing the motor and an on-off switch 162 for controlling electrical energization of the motor. In operation, the radio is disposed on the platform 153 and releasably held there as by clips 163. The plug 157 is inserted into jack 152 whereby the electrical signals generated by the cartridge 158 are substituted for signals from the tuner of the radio circuit and are played through the radio speaker.

The embodiment of FIG. 8 has the advantage of providing a radio-phonograph combination which offers a radio unencumbered in any manner by necessary phonograph components when it is desired to use the radio alone.

From the foregoing description it becomes clear that the present invention teaches a completely new method of reproducing sound from records. A record is disposed on a preferably horizontal flat surface which is relatively stationary. An entire phonograph system is rotatably mounted on a pedestal and disposed in the center of the record. By means of a motor, also mounted on the pedestal, the entire reproducing system is rotated while the record is maintained stationary. This method of reproducing sound from records does not require a mechanism having a record support portion and an arm support portion separated by at least the distance of the radius of a record. Thus, the requirement that the mechanism have one dimension at least as large as the radius of the record does not apply to the present invention. While the present invention has been shown as being somewhat larger than the radius of the record illustrated, there is nothing which demands this relative size and it should be clear that a much smaller device is possible. Thus, by virtue of the novel method taught in the present invention it is possible to provide a device for playing all popular size records while the device itself is no larger than a small pocket size radio.

I claim:

1. A phonograph comprising in combination:
   a housing;
   a transducer carrying arm having one end secured to said housing, said arm having a variable length to accommodate records of various diameters having annular recording band ends;
   a transducer carried by the other end of said arm for playing said records;
   means together with said arm for reproducing sound from a record, said means carried by said housing;
   means rotatably supporting said housing about an axis concentric with the center of the annular recording band of a record to be played; and
   means operable to rotate said housing and said arm and transducer carried thereby about said axis.

2. A phonograph comprising in combination;
   a housing having a lower member;
   means carried by said housing for reproducing sound from a record having an annular recording band;
   a pedestal rotatively secured to the lower member of said housing and adapted to fit over the central portion of said record within the inner margin of the annular recording band thereof, said pedestal including a circular portion having a generally vertical circumferential surface;
   a motor carried by said housing having a drive shaft which extends downwardly through the lower member of said housing;
   a drive wheel connected to the shaft of said motor and disposed to bear against the generally vertical surface of the circular portion of said pedestal whereby said housing and sound reproducing means carried by the housing can be rotated relative to said pedestal and the record on which the pedestal rests.

3. The phonograph of claim 2 wherein the generally vertical surface concave to enhance the driving connection formed between it and said drive wheel.

4. In combination with a phonograph record disc having an annular recording band, a phonograph comprising in combination;
   a housing having a generally horizontal lower member with a slot therein;
   means carried by said housing for reproducing sound from said record;
   a pedestal rotatively secured to the lower member of said housing and fitting over the central portion of said record within the inner margin of the annular recording band thereof;
   a motor, carried by said housing, having a generally horizontally disposed drive shaft;
   a drive wheel secured to said shaft so as to lie in a generally vertical plane and disposed such that a portion thereof extends through the slot in the lower member of said housing and rides on the record, the record disc being the sole support for the phonograph through the pedestal and the drive wheel engaging the same.

5. The phonograph as claimed in claim 4 wherein the position of said drive wheel in a horizontal plane is variable to vary the speed of rotation of the housing and the sound reproducing means carried thereby.

6. In combination with a phonograph disc record, a phonograph comprising: a housing carrying means for converting electrical signals to sound vibrations, transducer means carried by said housing and responsive to recordings on a stationary horizontally disposed disc record having areas recorded thereon for generating electrical signals corresponding thereto, means for feeding said electrical signals generated by said transducer means to said first mentioned means, first means supported entirely by said disc record for rotatably supporting said housing and said transducer and feeding means over said record, and second means including motor means and means driven by said motor means which engages one of said first means and said record disc for rotating said housing and other means over the disc record to carry the transducer means over said recorded areas of the record, the weight of said second means being supported solely by the disc record.

7. The phonograph of claim 6 wherein said first means includes a pedestal adapted to be supported on the center of the disc record; said housing supported for rotation on said pedestal about an axis concentric with the center of the record; said housing including means for amplifying said electrical signals and converting the same to sound waves, said transducer means being carried by said housing; and said drive means driven by said motor means riding around the pedestal to carry the housing and said means carried thereby around the pedestal.

8. The phonograph of claim 6 wherein said motor means is carried by said housing.

9. In combination with a grooved disc record, a phonograph comprising, in combination; a housing including an audio amplifier for amplifying electrical audio signals and a speaker to which the amplifier signals are fed; and an arm assembly carried by said housing and rotatably supported for rotation over said record and including a support member, an arm hinged to the outer end of said support member for movement about a vertical axis, and a transducer carried on the other end of said arm for generating electrical audio signals fed to said audio amplifier from the grooves on the disc record, and force producing means acting on said arm at the end thereof hinged to said support member to urge said arm and the transducer carried thereby downwardly with greater force than that produced by the weight of the arm alone to increase the contact pressure between the transducer and said record.

10. The phonograph of claim 9 wherein said support member is telescopically supported within said housing and movable between a retracted position in said housing and an extended position, and there is provided means for locking said support member in different extended positions for accommodating different sized records.

11. The phonograph of claim 9 wherein said support member is rotatable about a horizontal axis extending longitudinally thereof and said force producing means imparting rotation to said support member about said horizontal axis in a direction to move said arm downwardly.

12. The phonograph of claim 11 wherein said force producing means which is an eccentrically mounted weight carried by said support member.

13. The phonograph of claim 11 wherein said force producing means is a spring which imparts said rotation to said support member.

References Cited

UNITED STATES PATENTS

| | | | |
|---|---|---|---|
| 2,247,171 | 6/1941 | Harman | 179—100.11 |
| 2,486,661 | 11/1949 | Leitner | 274—9 |
| 3,044,783 | 7/1962 | Doncaster | 274—23 |
| 3,169,774 | 2/1965 | Daellenbach | 274—14 |
| 3,181,870 | 5/1965 | Lasswell | 274—9 |
| 3,224,782 | 12/1965 | Isemura | 274—14 |

JOHN M. HORAN, *Primary Examiner.*

NORTON ANSHER, C. B. PRICE, *Examiners.*

J. F. PETERS, *Assistant Examiner.*